United States Patent
Croak et al.

(10) Patent No.: US 8,682,711 B2
(45) Date of Patent: *Mar. 25, 2014

(54) METHOD AND APPARATUS FOR ANALYZING PROPOSED SERVICE FEATURES IN A COMMUNICATION NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/537,845

(22) Filed: Jun. 29, 2012

(65) Prior Publication Data

US 2012/0263284 A1    Oct. 18, 2012

Related U.S. Application Data

(63) Continuation of application No. 12/624,746, filed on Nov. 24, 2009, now Pat. No. 8,213,584, which is a continuation of application No. 11/323,024, filed on Dec. 30, 2005, now Pat. No. 7,626,941.

(51) Int. Cl.
*G06Q 10/00* (2012.01)
*H04M 3/42* (2006.01)
*H04L 12/66* (2006.01)

(52) U.S. Cl.
USPC .................. 705/7.35; 379/201.02; 370/352

(58) Field of Classification Search
USPC ............ 705/7, 36, 10, 35, 38, 39, 7.35, 7.37; 370/352, 252, 238, 241, 247, 248; 709/226, 229, 203, 219
See application file for complete search history.

(56) References Cited

U.S. PATENT DOCUMENTS

| | | | |
|---|---|---|---|
| 6,832,205 B1 | 12/2004 | Aragones et al. | |
| 7,054,940 B2 | 5/2006 | Litwin | |
| 7,257,560 B2 | 8/2007 | Jacobs et al. | |
| 7,313,133 B2 * | 12/2007 | Yarlagadda | 370/352 |
| 7,343,334 B1 * | 3/2008 | Adduci et al. | 705/36 R |
| 7,626,941 B1 * | 12/2009 | Croak et al. | 370/252 |
| 8,213,584 B2 * | 7/2012 | Croak et al. | 379/114.02 |
| 2006/0026010 A1 | 2/2006 | Van Moorsel et al. | |

* cited by examiner

*Primary Examiner* — Hanh N Nguyen

(57) ABSTRACT

Method and apparatus for analyzing a proposed service feature in a communication network is described. In one example, a call flow for supporting the service feature in the communication network is created, where at least one network component supports the call flow. First cost data for internally developing the at least one network component is determined. Second cost data for procuring the at least one network component from third party entity is determined. The first cost data and the second cost data are processed to generate a recommendation for either internally developing or externally procuring the at least one network element.

20 Claims, 3 Drawing Sheets

METHOD AND APPARATUS FOR ANALYZING PROPOSED SERVICE FEATURES IN A COMMUNICATION NETWORK

This application is a continuation of U.S. patent application Ser. No. 12/624,746, filed Nov. 24, 2009, which is currently allowed and is a continuation of U.S. patent application Ser. No. 11/323,024, filed Dec. 30, 2005, now U.S. Pat. No. 7,626,941; both of which are herein incorporated by reference in their entirety.

BACKGROUND OF THE INVENTION

1. Field of the Invention

Embodiments of the present invention generally relate to telecommunications systems and, more particularly, to a method and apparatus for analyzing proposed service features in a communication network 2. Description of the Related Art Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

In order to be successful, VOIP providers must often operate at a lower cost structure and face more strenuous time-to-market demands that traditional circuit-switched network provides, such as the PSTN. As such, VOIP providers are often faced with decisions regarding outsourcing certain services and network components or investing in internal development of proposed service features. Accordingly, there exists a need in the art for a method and apparatus for analyzing proposed service features in a communication network.

SUMMARY OF THE INVENTION

Method and apparatus for analyzing a proposed service feature in a communication network is described. In one embodiment, a call flow for supporting the service feature in the communication network is created, where at least one network component supports the call flow. First cost data for internally developing the at least one network component is determined. Second cost data for procuring the at least one network component from third party entity is determined. The first cost data and the second cost data are processed to generate a recommendation for either internally developing or externally procuring the at least one network element. A network provider may use the recommendation when making a decision to internally develop network components or externally procure network components.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
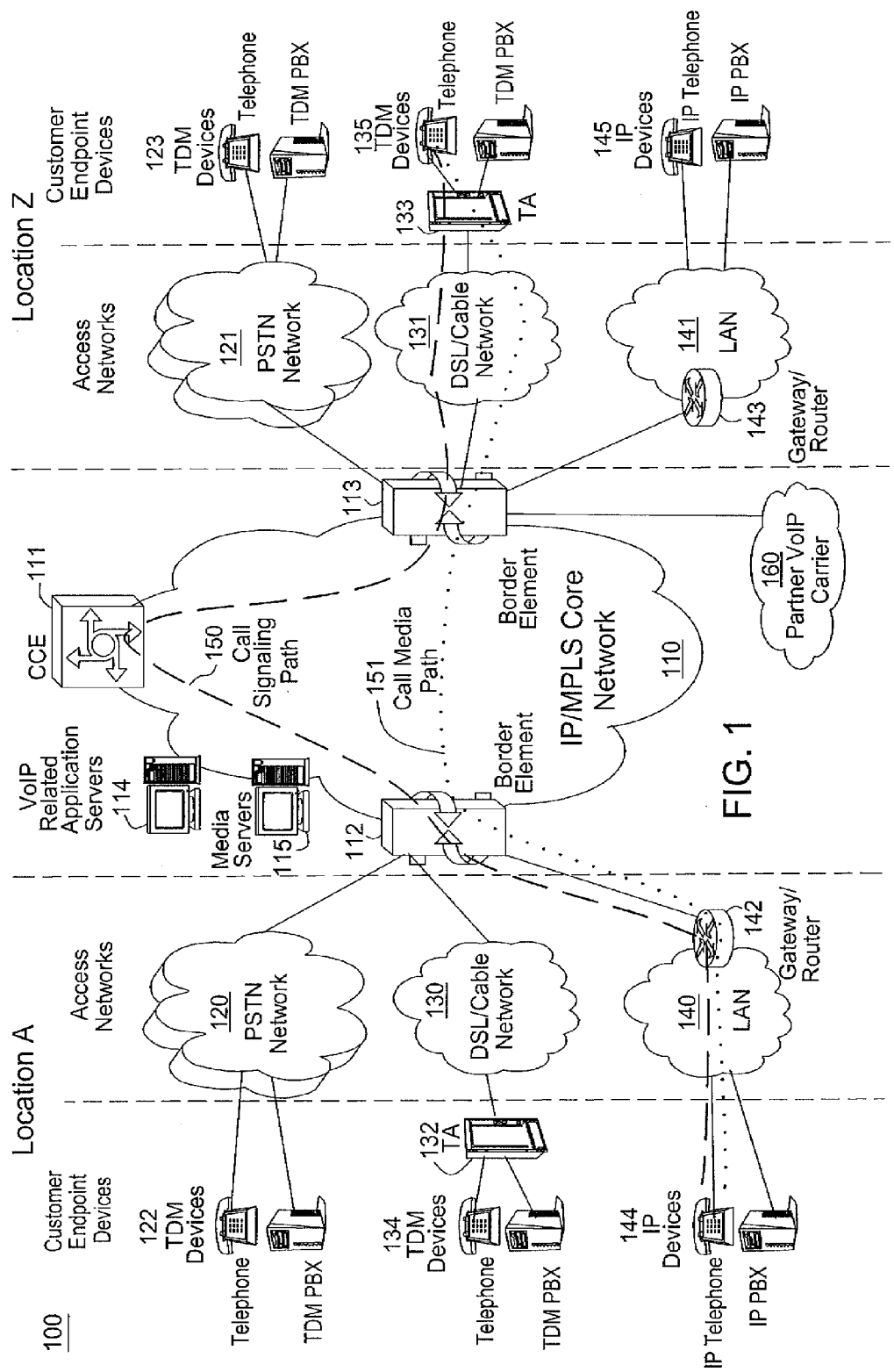
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TOM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
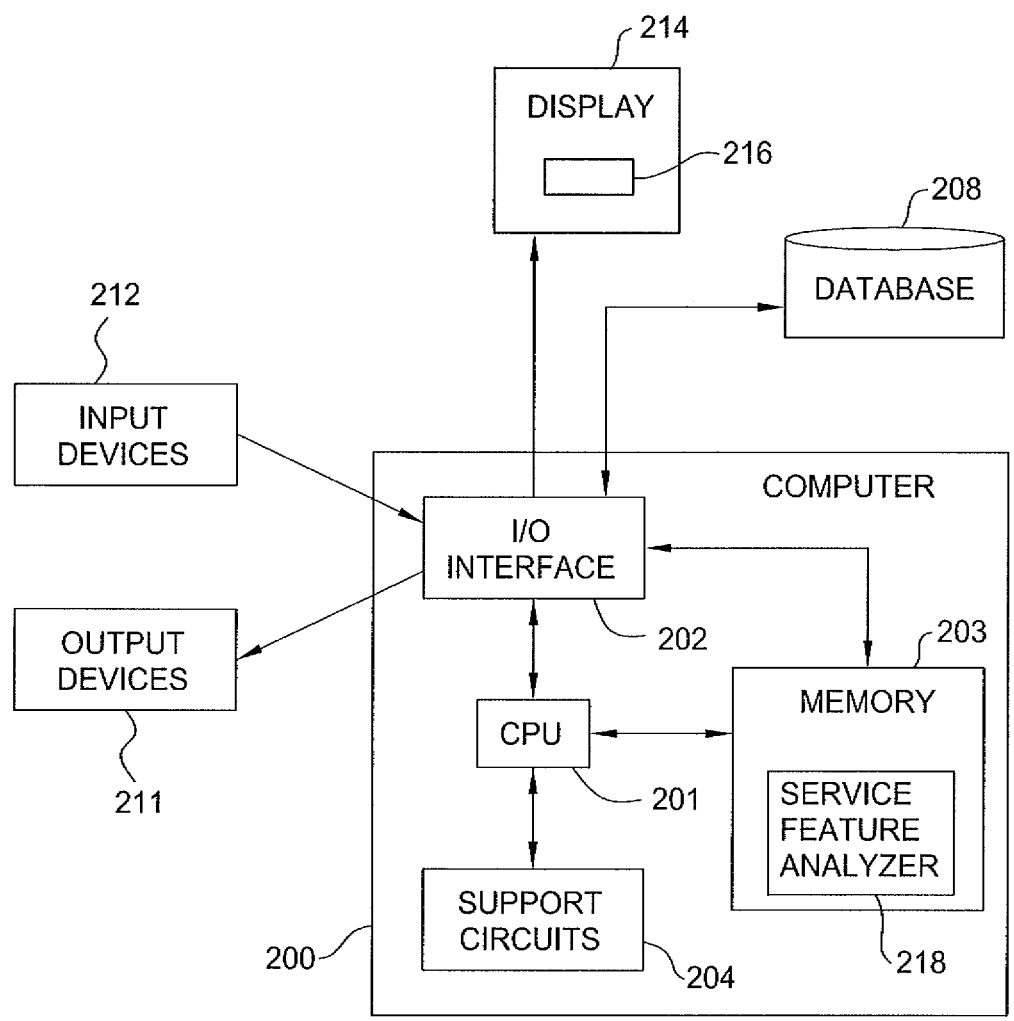
FIG. 2 is a block diagram depicting an exemplary embodiment of a computer suitable for implementing the processes and methods described herein.

FIG. 2 is a block diagram depicting an exemplary embodiment of a computer 200 suitable for implementing the processes and methods described herein. The computer 200 includes a central processing unit (CPU) 201, a memory 203, various support circuits 204, and an I/O interface 202. The CPU 201 may be any type of microprocessor known in the art. The support circuits 204 for the CPU 201 include conventional cache, power supplies, clock circuits, data registers, I/O interfaces, and the like. The I/O interface 202 may be directly coupled to the memory 203 or coupled through the CPU 201. The I/O interface 202 may be coupled to various input devices 212 and output devices 211, such as a conventional keyboard, mouse, printer, and the like. The I/O interface 202 is also coupled to a display 214.

The memory 203 may store all or portions of one or more programs and/or data to implement the processes and methods described herein. Notably, the memory 203 may store program code to be executed by the CPU 201 for implementing a service feature analyzer 218. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 200 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 203. The memory 203 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

The service feature analyzer 218 is configured to analyze proposed service features in a communication network and generate recommendations for deploying network elements to implement call flows to support the proposed service features. In particular, a user may interact with the service feature analyzer 218 (e.g., using the input devices 212, the output devices 211, and/or the display 214) to create a call flow for supporting a particular service feature in the communication network. A call flow comprises one or more network components to implement the service feature. The network components may be hardware components (e.g., network elements, such as servers, routers, and the like), software components, or a combination of hardware and software components.

For example, assume a call forwarding service feature is proposed. A call flow may be created that includes software components for implementing the call forwarding feature in the communication network. Such software components may include, for example, a software component in an application server for collecting call routing preferences from customers, a software component in CCEs for querying application servers for information to route calls, and a software component in application servers for determining the routing information in response to queries from CCEs.

The service feature analyzer 218 is configured to determine first cost data for internally developing the network component(s) of the call flow supporting the proposed service feature. Internal development refers to developing the network component(s) using internal resources of the entity that owns and operates the communication network. The first cost data may include various factors, such as development costs of the network component(s) over time, maintenance costs of the network component(s) over time, operating costs of the network component(s) over time, and the like. The first cost data may also account for potential revenue associated with internal development of network component(s), such as the value of intellectual property (e.g., patents) obtained as a result of developing the network components. The factors in the first cost data may be input by the user or automatically obtained from a database 220 of such information.

The service feature analyzer 218 is further configured to determine second cost data for procuring the network component(s) from a third party entity. The second cost data may include various factors, such as procurement costs associated with the network component(s), licensing costs, service costs, as well as other incidental and consequential costs, such as costs related to contracting with third parties. The factors in the second cost data may be input by the user or automatically obtained from the database 220.

The service feature analyzer 218 then processes the first cost data and the second cost data to generate a recommendation for either internally developing the network component(s) or procuring the network component(s) from a third party entity. In one embodiment, the factors in the first cost data and the factors in the second cost data are weighted. In one embodiment, the factors are weighted in accordance with their contribution to potential revenue over time. The weighted factors in the first cost data are combined using any type of mathematical operation known in the art to produce a first score. The weighted factors in the second cost data are combined using a mathematical operation to produce a second score. The first and second scores may be compared, and a recommendation generated based on the comparison. For example, the weighting of the factors may be configured such that a higher score indicates a more desirable alternative.

Then, the choice between internal development or external procurement may be made based on the scores. A representation 216 of the recommendation may be displayed on a display 214. For example, the representation 216 may comprise text, graphics, or a combination thereof configured for display on a graphical user interface (GUI).

Figure 3:
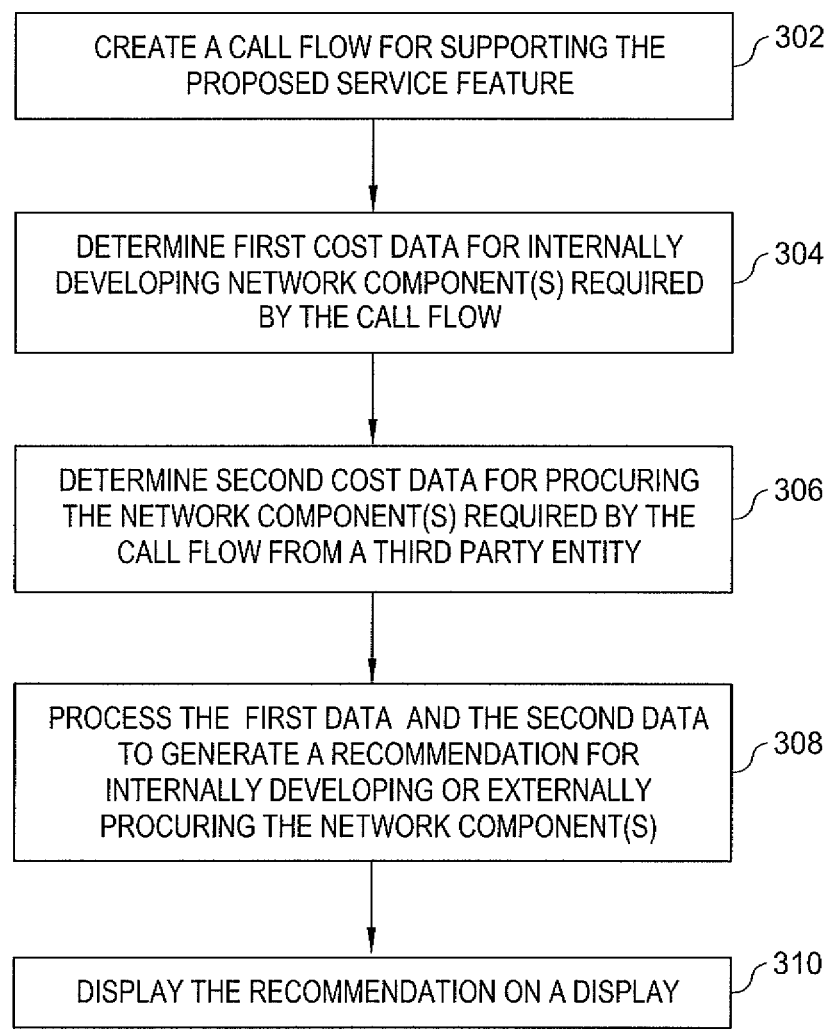
FIG. 3 is a flow diagram depicting an exemplary embodiment of a method for analyzing a proposed service feature in a communication network in accordance with one or more aspects of the invention.

FIG. 3 is a flow diagram depicting an exemplary embodiment of a method 300 for analyzing a proposed service feature in a communication network in accordance with one or more aspects of the invention. The method 300 begins at step 302, where a call flow is created for supporting the service feature. At step 304, first cost data is determined for internally developing network component(s) required by the call flow. At step 306, second cost data is determined for procuring the network component(s) required by the call flow from a third party entity. At step 308, the first cost data and the second cost data is processed to generate a recommendation for either internally developing the network component(s) or externally procuring the network component(s). At step 310, the recommendation is displayed on a display. The method 300 may be repeated for various proposed service features.

Method and apparatus for analyzing a proposed service feature has been described. In one embodiment, a tool is provided to assist a network provider determine whether internal development of network component(s) for the proposed service feature or external procurement of such network component(s) is the most cost efficient over time. Factors such as development costs, licensing fees, and the value of intellectual property are weighted to reflect their contribution to potential revenue over time and compared.

While the foregoing is directed to embodiments of the present invention, other and further embodiments of the invention may be devised without departing from the basic scope thereof, and the scope thereof is determined by the claims that follow.

The invention claimed is:

1. A method of providing a recommendation for a service feature in a communication network, comprising:
creating, by a processor, a call flow for supporting the service feature in the communication network, where the call flow defines a network component having a software component that is necessary for supporting the service feature that is proposed;
determining, by the processor, first cost data for internally developing the network component having the software component required by the call flow to support the service feature that is proposed, wherein internally developing comprises using internal resources of an entity that owns and operates the communication network;
determining, by the processor, second cost data for externally procuring the network component having the software component required by the call flow to support the service feature that is proposed from a third party entity; and
comparing, by the processor, the first cost data and the second cost data for presenting the recommendation that is selected between a recommendation for internally developing the network component having the software component required by the call flow to support the service feature that is proposed and a recommendation for externally procuring the network component having the software component required by the call flow to support the service feature that is proposed.

2. The method of claim 1, wherein the first cost data accounts for a development cost associated with the network component over a time period.

3. The method of claim 2, wherein the first cost data accounts for a value of intellectual property associated with the network component over a time period.

4. The method of claim 1, wherein the second cost data accounts for a procurement cost associated with the network component over a time period.

5. The method of claim 1, wherein the presenting:
displaying a representation of the recommendation on a display.

6. The method of claim 1, wherein the communication network comprises a packet network.

7. The method of claim 6, wherein the packet network comprises an internet protocol network.

8. An apparatus for providing a recommendation for a service feature in a communication network, comprising:
a processor; and
a non-transitory computer readable medium storing a plurality of instructions which, when executed by the processor, cause the processor to perform operations, the operations comprising:
creating a call flow for supporting the service feature in the communication network, where the call flow defines a network component having a software component that is necessary for supporting the service feature that is proposed;
determining first cost data for internally developing the network component having the software component required by the call flow to support the service feature that is proposed, wherein internally developing comprises using internal resources of an entity that owns and operates the communication network;
determining second cost data for externally procuring the network component having the software component required by the call flow to support the service feature that is proposed from a third party entity; and
comparing the first cost data and the second cost data for presenting the recommendation that is selected between a recommendation for internally developing the network component having the software component required by the call flow to support the service feature that is proposed and a recommendation for externally procuring the network component having the software component required by the call flow to support the service feature that is proposed.

9. The apparatus of claim 8, wherein the first cost data accounts for a development cost associated with the network component over a time period.

10. The apparatus of claim 9, wherein the first cost data accounts for a value of intellectual property associated with the network component over a time period.

11. The apparatus of claim 8, wherein the second cost data accounts for a procurement cost associated with the network component over a time period.

12. The apparatus of claim 8, wherein the presenting:
displaying a representation of the recommendation on a display.

13. The apparatus of claim 8, wherein the communication network comprises a packet network.

14. The apparatus of claim 13, wherein the packet network comprises an internet protocol network.

15. A non-transitory computer readable medium storing instructions that, when executed by a processor, cause the processor to perform operations for providing a recommendation for a service feature in a communication network, the operations comprising:
creating a call flow for supporting the service feature in the communication network, where the call flow defines a network component having a software component that is necessary for supporting the service feature that is proposed;
determining first cost data for internally developing the network component having the software component required by the call flow to support the service feature that is proposed, wherein internally developing comprises using internal resources of an entity that owns and operates the communication network;
determining second cost data for externally procuring the network component having the software component required by the call flow to support the service feature that is proposed from a third party entity; and
comparing the first cost data and the second cost data for presenting the recommendation that is selected between a recommendation for internally developing the network component having the software component required by the call flow to support the service feature that is proposed and a recommendation for externally procuring the network component having the software component required by the call flow to support the service feature that is proposed.

16. The non-transitory computer readable medium of claim 15, wherein the first cost data accounts for a development cost associated with the network component over a time period.

17. The non-transitory computer readable medium of claim 16, wherein the first cost data accounts for a value of intellectual property associated with the network component over a time period.

18. The non-transitory computer readable medium of claim 15, wherein the second cost data accounts for a procurement cost associated with the network component over a time period.

19. The non-transitory computer readable medium of claim 15, wherein the presenting:
displaying a representation of the recommendation on a display.

20. The non-transitory computer readable medium of claim 15, wherein the communication network comprises a packet network.

* * * * *